United States Patent [19]
Takamura

[11] Patent Number: 5,455,896
[45] Date of Patent: Oct. 3, 1995

[54] THREE-DIMENSIONAL GEOMETRY PROCESSING SYSTEM

[75] Inventor: Teiji Takamura, Tokyo, Japan

[73] Assignee: Ricoh Company, Ltd., Tokyo, Japan

[21] Appl. No.: 350,117

[22] Filed: Nov. 29, 1994

Related U.S. Application Data

[63] Continuation of Ser. No. 820,978, Jan. 15, 1992, Pat. No. 5,414,802.

[30] Foreign Application Priority Data

Jan. 17, 1991 [JP] Japan ................................ 3-018315

[51] Int. Cl.$^6$ .................................................. G06F 17/50
[52] U.S. Cl. ............................ 395/119; 395/120; 395/121
[58] Field of Search .................................... 395/119, 120, 395/121, 123, 124

[56] References Cited

U.S. PATENT DOCUMENTS

| | | | |
|---|---|---|---|
| 4,890,242 | 12/1989 | Sinha et al. | 395/119 |
| 5,014,230 | 5/1991 | Sinha et al. | 395/119 |
| 5,086,496 | 2/1992 | Mulmuley | 395/121 |
| 5,261,028 | 11/1993 | Udea | 395/119 |

Primary Examiner—Heather R. Herndon
Assistant Examiner—Cliff Nguyen Vo
Attorney, Agent, or Firm—Popham, Haik, Schnobrich & Kaufman, Ltd.

[57] ABSTRACT

A three-dimensional geometry processing system generates an intersection curve between two surfaces, an intersection point between a surface and a curve, an intersection point between three surfaces, and a parameter of a surface at a given point. In this system, candidate points for endpoints of an intersection curve between surfaces are generated and stored in a table, a judgment is made whether or not a tracing of intersection from one of the candidate points in the table can be performed, and, if it is judged that the tracing can be performed, a direction in which the tracing is performed is determined. Convergence calculations are performed so that a leading point of a tracing vector lies on both the two surfaces. Determination of the tracing direction and performance of the convergence calculations are repeated until a predetermined end condition is satisfied, thereby generating a set of points on the intersection curve between the surfaces and generating a sequence of curves which forms the intersection curve to be generated.

2 Claims, 11 Drawing Sheets

FIG.2

S11: GENERATE DERIVATIVES OF SURFACE $S_1$ AT $u_i$, $v_i$ AND DERIVATIVES OF SURFACE $S_2$ AT $r_i$, $s_i$.

S12: GENERATE PARAMETERS $u'$, $v'$, $r'$, $s'$ OF ENDPOINTS OF VECTOR.

S13: GENERATE COORDINATES $S_1(u', v')$, $S_2(r', s')$, DERIVATIVES AND TANGENT PLANES $P_1$, $P_2$.

S14: DETERMINE MIDDLE POINT $P'$ FROM $S_1(u', v')$ AND $S_2(r', s')$ WHEN $P_1$ AND $P_2$ ARE PARALLEL. DETERMINE MIDDLE POINT $P'$ FROM PROJECTIVE POINTS OF $S_1$, $S_2$ WHEN $P_1$ AND $P_2$ ARE NOT PARALLEL.

S15: OBTAIN $\delta u'$, $\delta v'$ BY SOLVING EQUATION (2) WHEN $V_1 = p' - S_1(u', v')$. OBTAIN $\delta r'$, $\delta s'$ BY SOLVING EQUATION (3) WHEN $_2 = p' - S_2(r', s')$.

S16: PROCEDURE ENDS IF VALUES OF $\delta u'$, $\delta v'$, $\delta r'$, $\delta s'$ ARE SMALL ENOUGH.

S17: UPDATE VALUES OF $u'$, $v'$, $r'$, $s'$ IF VALUES OF $\delta u'$, $\delta v'$, $\delta r'$, $\delta s'$ ARE SMALL ENOUGH, AND RETURN TO STEP S13.

S41: INPUT FREE-FORM SURFACE DATA (S) AND POINT DATA (P)

S42: GENERATE POLYHEDRON BASED ON SURFACE DATA (S), AND PARAMETERS OF FACES OF POLYHEDRON

S43: OBTAIN POLYGON FROM POLYHEDRON, WHICH POLYGON LIES IN NEIGHBORHOOD OF POINT (P)

S44: OBTAIN ROUGH PARAMETERS FROM PARAMETERS OF POLYGON

S45: OUTPUT ROUGH PARAMETERS OF SURFACE (S) AT POINT (P)

THREE-DIMENSIONAL GEOMETRY PROCESSING SYSTEM

This is a continuation of U.S. patent application Ser. No. 07/820,978, filed Jan. 15, 1992, now U.S. Pat. No. 5,414,802.

BACKGROUND OF THE INVENTION

The present invention relates generally to a geometry processing system, and more particularly to a three-dimensional geometry processing system in which a surface/surface intersection curve, a surface/curve intersection point, an intersection point between three surfaces and a parameter of a projective point on a surface are generated. This system is applicable to three-dimensional Boolean operations devices, three-dimensional free-form surface processing and others.

In computer aided design, several geometry processing techniques are known and used. Among such conventional techniques in the art are: generating a convex hull of a control point of a free-form surface or curve, generating an intersection point between a free-form surface and a parametric curve, generating an internal intersection point between two free-form surfaces, generating coordinates of points on a free-form surface or curve, generating a normal vector of a free-form surface, generating a derivative vector of a free-form surface or curve, generating an approximate polyhedron based on free-form surface data, generating a polyline (plural line segments) based on free-form surface data, generating an intersection point between a plane and a straight line, generating a projective point by projection from a point onto an algebraic surface or plane, generating an intersection point between three planes, generating a parameter of a free-form surface at a point thereon located at the least distance from a specified point. Some of the above mentioned techniques are applied for carrying out the present invention.

In the prior art, "Surface/Surface Intersection" by R. E. Barnhill, G. Farin, M. Jordan and B. R. Piper in Computer Aided Geometric Design, 1987, vol. 4, No. 1–3, pp. 3–16 and "A Marching Method For Parametric Surface/Surface Intersection" by R. E. Barnhill, S. N. Kersey in Computer Aided Geometric Design, 1990, vol. 7, No. 1, pp. 257–280, disclose that tracing vectors, tracing end conditions and an intersection point between intersection curves are used in free-form surface/surface intersection calculations, but there is no more disclosure about other techniques. "Predictor-Corrector Type of Intersection Algorithm for $C^2$ Parametric Surfaces" by J. J. Chen and T. M. Ozsoy in Computer Aided Geometric Design, 1988, vol. 20, No. 6, pp. 347–352 discloses the uses of tracing vectors and tracing end conditions in free-form surface/surface intersection calculations, but there is no teaching of other more advanced techniques. If the above techniques are simply applied to a known intersection tracing method for generating an intersection curve between free-form surfaces, it is difficult to judge how to start an intersection tracing procedure because a start point at which the procedure is started cannot be easily determined.

There is also a disclosure in the prior art. "Method of Calculating Arbitrary-Order Parametric Curve/Plane Surface Intersection" by Fujisawa and Takamura in the 39th conference of Information Processing Society of Japan, October, pp. 936–937, discloses a technique of calculating intersection between a curve and a plane. "Method of Calculating Arbitrary-Order Parametric Curve/Plane Surface Intersection" by A. G. O'Neill and Takamura in the 39th conference of Information Processing Society of Japan, October, pp. 938–939, discloses a method of calculating an intersection point between a curve and a quadric surface. However, when these conventional techniques are simply applied, it is difficult to realize a technique or system for generating an intersection point between a curve and a surface.

There is also a conventional technique for generating an intersection point between three planes, or generating an intersection point between three low-order algebraic surfaces. However, there is no disclosure of a more advanced technique for generating an intersection point between three surfaces. Moreover, "Analytic Techniques for Geometric Intersection Problems" by V. Chandru and B. S. Kochar in Geometric Modeling, Farin, G.(Ed), SIAM, Philadelphia, 1987, pp. 305–318, discloses a conventional technique for calculating a geometric intersection. This technique is an analytic approach for solving the intersection problems. However, it is difficult to generate a parameter of a free-form surface at a point when the point does not lie on the surface precisely. The procedure of this technique greatly depends on the type of the surface, and it is difficult to perform reliably the procedure when a higher-order surface is processed.

SUMMARY OF THE INVENTION

Accordingly, it is a general object of the present invention to provide an improved three-dimensional geometry processing system in which the above described problems are eliminated.

Another and more specific object of the present invention is to provide a three-dimensional geometry processing system which ensures the reliability and accuracy of a generated intersection curve between two free-form surfaces. The intersection curve is generated through an intersection tracing method for tracing the intersection curve starting from a point on the intersection curve and each of such candidate points are previously generated and stored in an endpoint table. The above mentioned object of the present invention can be achieved by a three-dimensional geometry processing system which includes a checking part for checking whether or not there is an intersection between convex hulls of the surfaces by obtaining the convex hulls of the surfaces at control points, a start-point generating part for generating candidate points of endpoints of the intersection curve by obtaining the results of calculations of intersection points between a surface and a curve and the results of calculations of internal intersection points between two surfaces based on the convex hulls of the surfaces, and for storing the candidate points in a table, a direction generating part for determining a direction in which a tracing of intersection is performed with a tracing vector based on each of the candidate points stored in the table, a selecting part for extracting a point and a vector from the table in which the candidate points are stored, the extracted point having a vector with which the tracing of intersection is not performed, a tracing part for generating a set of points lying on the intersection curve and generating a set of direction vectors at the points on the intersection curve by performing the tracing of intersection with the extracted point and vector, a curve-sequence generating part for generating a sequence of curves based on the points and direction vectors generated by the tracing part, and a dividing part for dividing the intersection curve at intersection points between the curves, which curves are generated by the curve-sequence generating part, by generating the intersection points between the curves. According to the present invention, it is possible to generate an intersection curve between two surfaces reliably. The generation of the intersection curve performed by this system neither depends on the type of the surfaces nor depends on the degree of order of the surfaces, which will realize performance of three-dimensional Boolean operations.

A still another object of the present invention is to provide a three-dimensional geometry processing system which ensures the reliability and accuracy of the generated intersection point between a free-form surface and a parametric curve. The above mentioned object of the present invention can be achieved by a three-dimensional geometry processing system which includes a checking part for checking whether or not there is an intersection between convex hulls by obtaining a convex hull of the surface at a given control point and a convex hull of the curve at a given control point, a generating part for generating a rough intersection point between a plane and a line by obtaining a polyhedron with a polygonal face from the surface and obtaining a polyline from the curve and for generating a parameter of the surface at the rough intersection point and a parameter of the curve at the rough intersection point, the plane being determined by the polygonal face and the line being determined by the polyline, and an adjusting part for generating an intersection point between the surface and the curve by adjusting the rough intersection point generated by the generating part. According to the present invention, it is possible to generate an intersection point between a surface and a curve reliably. The generation of the intersection point performed by this system neither depends on the types of the surface and the curve nor depends on the degree of order thereof. This will realize a speedy, accurate calculation of points on an intersection curve between two surfaces when three-dimensional geometry is processed.

A further object of the present invention is to provide a three-dimensional geometry processing system which ensures the reliability and accuracy of a generated intersection point between three surfaces. The above mentioned object of the present invention is achieved by a three-dimensional geometry processing system which includes an input part for inputting data of three surfaces and a rough intersection point between the surfaces, a first generating part for generating coordinates and parameters of three projective points which projective points are obtained by projection of the rough intersection point on each of the surfaces, a second generating part for generating a tangent plane of each of the surfaces at the corresponding projective point, generated by the first generating part, by using a normal vector of each of the surfaces, a third generating part for generating an intersection point between the three tangent planes generated by the second generating part, and a fourth generating part for generating a projective point on each of the three surfaces by projection of the intersection point generated by the third generating part. According to the present invention, it is possible to generate an intersection point between three free-form surfaces reliably. The generation of the intersection point performed by this system neither depends on the type of the surfaces nor depends on the degree of order of the surfaces. This will attain the generation of accurate coordinates of an intersection curve between surfaces.

A further object of the present invention is to provide a three-dimensional geometry processing system which enables generation of parameters of a projective point on a surface from a point when the point does not lie on the surface precisely. The above mentioned object of the present invention can be achieved by a three-dimensional geometry processing system which includes an input part for inputting data of a surface and a point, a parameter generating part for generating rough parameters of the surface by obtaining a polyhedron based on the surface, a polygon in the polyhedron lying in neighborhood of the point, and parameters of the polygon at a given point of the polygon, and a parameter adjusting part for generating parameters of the surface at the point by obtaining the rough parameters generated by the parameter generating part, a tangent plane of the surface at the rough parameters, and a projective point on the tangent plane from the point. According to the present invention, it is possible to generate a parameter of a projective point on a surface reliably even when a point does not lie on the surface precisely. The generation of parameters of a surface at a projective point performed by this system neither depends on the type of the surface nor depends on the degree of order of the surface, which assures the generation of accurate parameters of the surface when an intersection curve between surfaces is generated.

Other objects and further features of the present invention will be apparent from the following detailed description when read in conjunction with the accompanying drawings.

DESCRIPTION OF THE PREFERRED EMBODIMENTS

Figure 1:
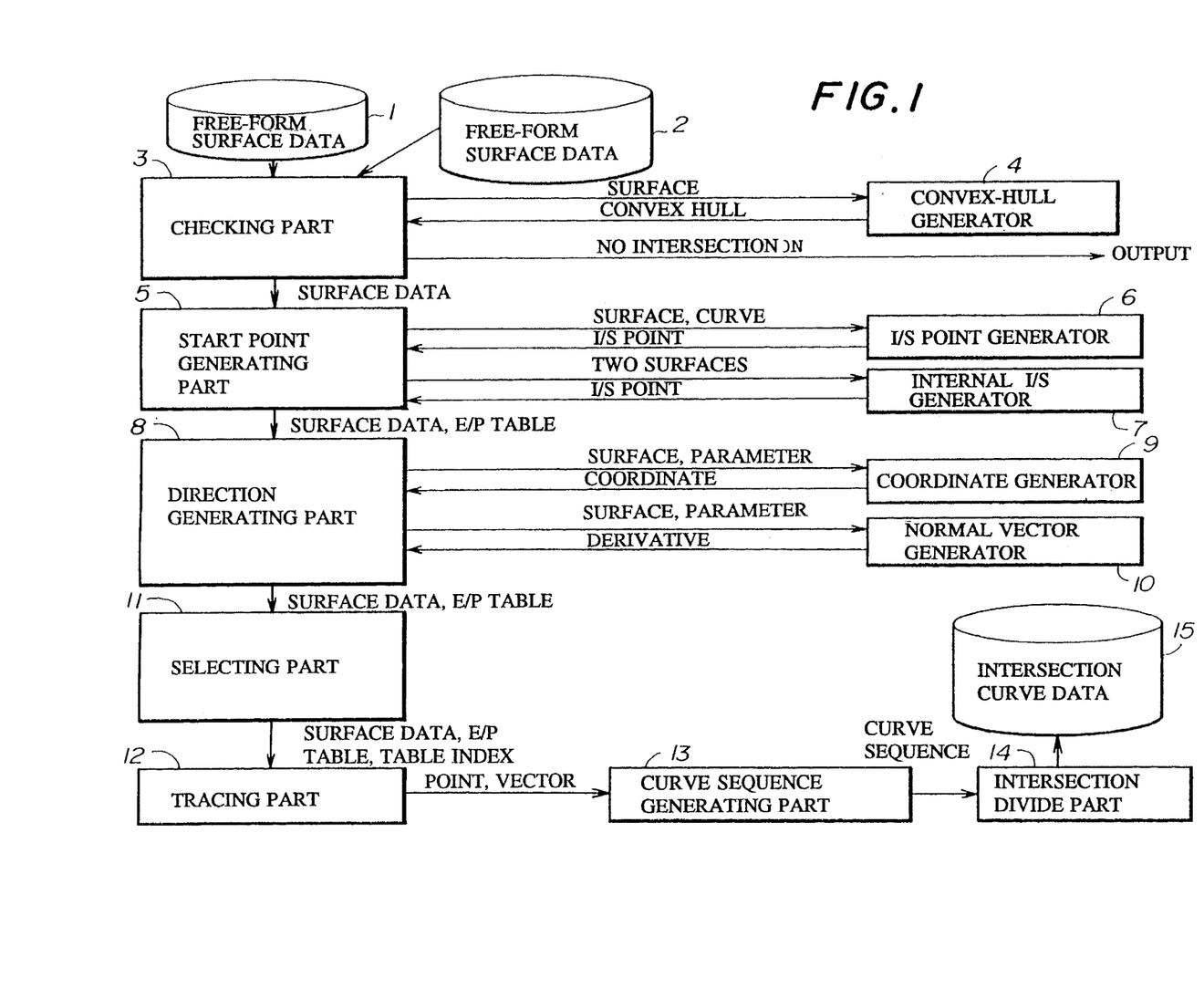
FIG. 1 is a block diagram showing a three-dimensional geometry processing system in a first embodiment of the invention.

First, a description will be given of a first embodiment of a three-dimensional geometry processing system according to the present invention, with reference to FIGS.1 through 3. In FIG. 1, this three-dimensional geometry processing system includes a free-form surface data 1, a free-form surface data 2, a checking part 3 for checking whether or not there is an intersection between convex hulls, a convex hull generator 4 for generating a convex hull of a control point of a free-form surface, a start-point generating part 5 for generating a start point from which intersection tracing is started, an intersection-point generator 6 for generating an intersection point between a free-form surface and a parametric curve, an internal intersection generator 7 for generating an internal intersection point between two free-form surfaces, a direction generating part 8 for generating a direction in which the intersection tracing is performed, a coordinate generator 9 for calculating coordinates of points on a free-form surface, a normal-vector generator 10 for generating a normal vector perpendicular to a tangent plane of a free-form surface, a selecting part 11 for selecting a start point of the intersection tracing, a tracing part 12 for carrying out intersection tracing, a curve sequence generating part 13 for generating a sequence of curves, an intersection divide part 14 for dividing plural sequences of curves at intersection points between the curves, and an intersection curve data 15.

A major purpose of the above mentioned three-dimensional geometry processing system is to generate an intersection curve between two free-form surfaces. Candidate points which may be an endpoint of the intersection curve to be generated are first generated and stored in an endpoint table. A judgment is made whether or not the intersection tracing from one of the candidate points can be performed, and, if it is judged that the intersection tracing can be performed, a direction in which the tracing is performed is determined. Convergence calculations are performed so that a leading point of a tracing vector lies on both the two surfaces. Determination of the tracing direction and performance of the convergence calculations are repeated until a predetermined tracing end condition is satisfied, thereby generating one or more sequences of curves. Intersection points between the generated curves are determined if plural curve sequences are generated, and the curve sequences are divided at the intersection points thus determined.

The conventional devices used in this three-dimensional geometry processing system are the convex hull generator 4, the intersection-point generator 6, the internal intersection generator 7, the coordinate generator 9 and the normal-vector generator 10.

A detailed description of an intersection tracing procedure performed by the system shown in FIG. 1 will now be given. The convex-hull generator 4 generates convex hulls between two free-form surfaces based on the free-form surface data 1 and 2, and the checking part 3 checks whether or not there is an intersection between the convex hulls. If there is no intersection between the convex hulls, the checking part 3 makes the intersection tracing procedure end, since the two free-form surfaces actually have no intersection. Based on the results of calculations of free-form surface/curve intersection performed by the intersection point generator 6 and calculations of surface/surface internal intersection performed by the internal intersection generator 7, candidate points which may be endpoints of an intersection curve are generated by the start-point generating part 5 and stored in the endpoint table. When the endpoint table contains no endpoint, the two surfaces have no intersection and the intersection tracing procedure ends.

The following table TABLE 1 shows the correspondence between the parameters and the symbols, which parameters are used in the three-dimensional geometry processing system according to the present invention.

TABLE 1

| |
|---|
| $u[1,i] \rightarrow u_i$ |
| $v[1,i] \rightarrow v_i$ |
| $r[2,i] \rightarrow r_i$ |
| $s[2,i] \rightarrow s_i$ |

Based on each of the endpoints included in the endpoint table, the direction generating part 8 determines a direction in which the intersection tracing is made from each endpoint in the endpoint table. For this purpose, the direction generating part 8 determines a direction of a tracing vector v from each of the endpoints by scanning the endpoint table and extracting the endpoints from the table. When two free-form surfaces $S_1$ and $S_2$ are given and an endpoint Pi ( "i" denotes an index of the endpoint table) is extracted from the endpoint table, it is assumed that parameters of the surface $S_1$ at the endpoint Pi are denoted by u[1,i], v[1,i], and parameters of the surface $S_2$ at the endpoint Pi are denoted by r[2,i], s[2,i]. By means of the coordinate generator 9 and the normal-vector generator 10, a tangent plane of the surface $S_1$ at (u[1,i], v[1,i]) and a tangent plane of the surface $S_2$ at (r[2,i], s[2,i]) are generated, and an intersection line L between the tangent planes is determined by the direction generating part 8. The tracing vector v at the point Pi has the same direction as that of the intersection line L.

The selecting part 11 extracts, from the endpoint table, an endpoint and a tracing vector, the endpoint having a vector with which the tracing is not yet performed. Assuming that Pi is the extracted endpoint (i: an index of the endpoint table), the parameters of the surface $S_1$ at the point Pi are denoted by u[1,i], v[1,i]and the parameters of the surface $S_2$ at the point Pi are denoted by r[2,i], s[2,i].

The tracing part 12 generates points on the intersection curve as well as direction vectors thereon used when the intersection tracing is performed. The intersection tracing is repeated until the predetermined tracing end conditions are satisfied. By using the points on the intersection curve and the direction vectors, the tracing vector is extended by an appropriate length from each of the points in a direction of the vector v, new points at the ends of the extended vector lying on the two free-form surfaces are determined through Newton-Raphson geometric method. And, the intersection tracing is again performed with the tracing vector by using the new points as the starting points. The above procedure is repeated until the tracing end conditions are satisfied, thereby generating a sequence of points on the intersection curve between the two free-form surfaces. Also, each of the vectors at the corresponding points can be obtained together with the sequence of points.

According to the present invention, when either one of the following two tracing end conditions is satisfied, the procedure of the intersection tracing ends.

1) A distance between an endpoint Pe of a tracing vector v and a point Pt on a trimming edge included in the endpoint table, determined by checking the coordinates of these points, is smaller than a length of the tracing vector, and when a vector is set to the point Pt, the vector has the same direction as that of the tracing vector.

2) An endpoint of a tracing vector does not lie within the parameter space concerning the two free-form surfaces.

The curve sequence generating part 13 generates a sequence of curves based on the points on the intersection curve and based on the direction vectors, generated by the tracing part 12. When plural sequences of curves are generated by the curve sequence generating part 13, intersection points between such curve sequences are calculated by the intersection divide part 14. If the intersection points are obtained, the intersection divide part 14 divides the curve sequences at the calculated points. The intersection divide part 14 generates intersection curve data 15.

In the first embodiment, it is possible to determine an intersection curve between two free-form surfaces by combining the functions of the above described parts 3 through 14. FIG. 3 shows an example of a free-form surface/surface intersection curve C which is thus determined.

Figure 2:
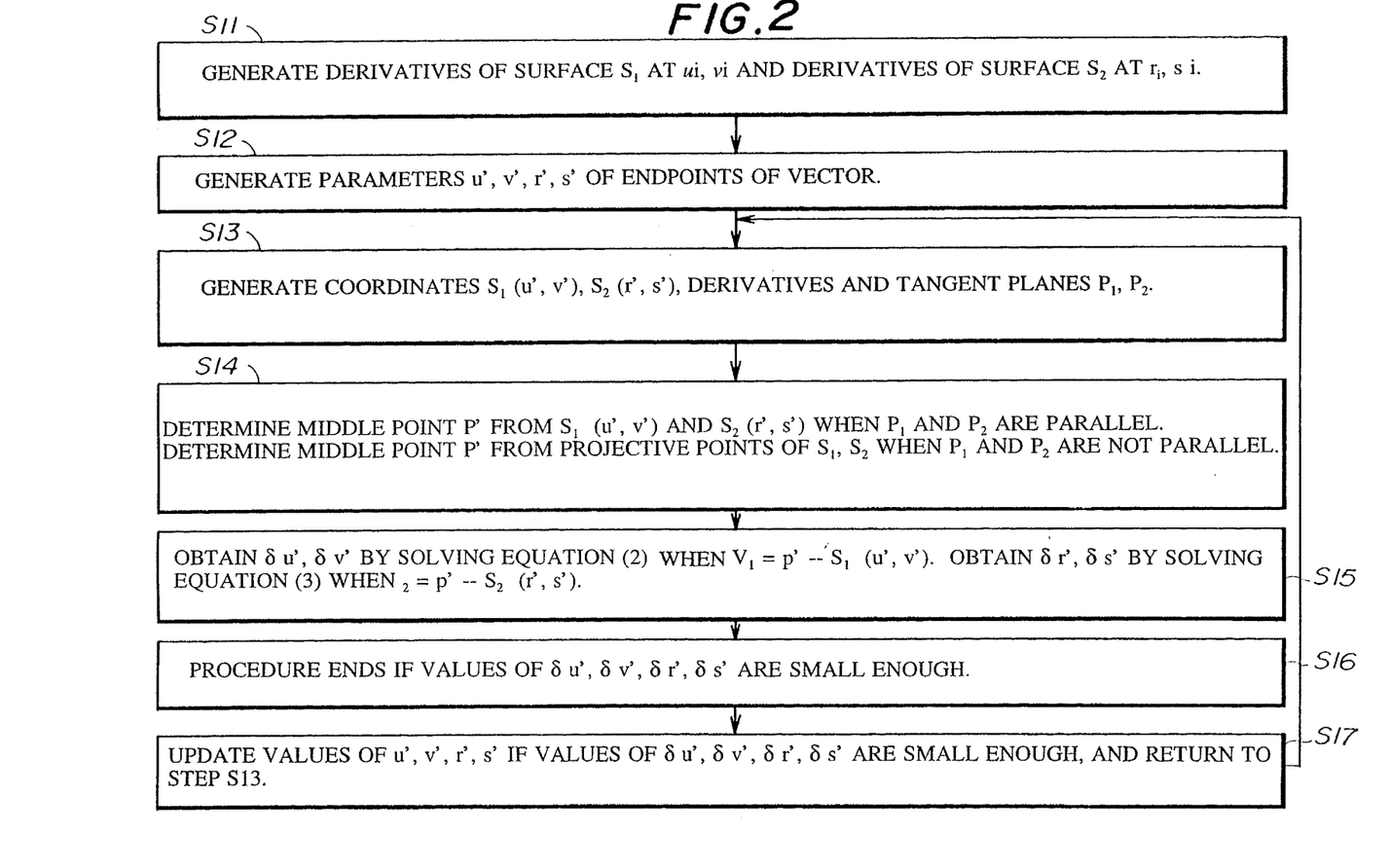
FIG. 2 is a flow chart for explaining convergence calculations performed by a tracing part of the system shown in FIG. 1.
Figure 3:
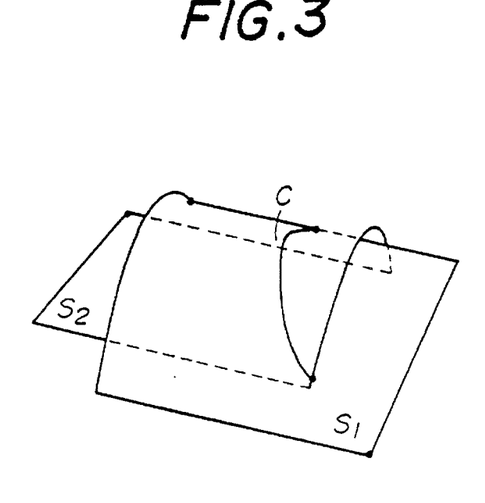
FIG. 3 is a diagram showing an intersection curve generated by the system shown in FIG. 1.

FIG. 2 shows a procedure of convergence calculations being performed by the tracing part 12. In step S11 of this procedure, partial derivatives of surface $S_1$ at $u_i$, $v_i$, represented by $\partial S_1(u_i, v_i)/\partial u$ and $\partial S_1(u_i, v_i)/\partial v$, and partial derivatives of surface $S_2$ at $r_i$, $s_i$, represented by $\partial S_2(r^i, s^i)/\partial r$ and $\partial S_2(r_i, s_i)/\partial s$, are calculated by means of a known derivative vector generator having a function of partial derivative vector calculation. In step S12, parameters of the surfaces $S_1$ and $S_2$ at leading points of a tracing vector v are obtained. Before the parameter values are obtained, $\delta u_i$, $\delta v_i$, $\delta r_i$, and $\delta s_i$ are determined based on the following equations:

$$v = \delta u_i\, \partial S_1(u_i,v_i)/\partial u + \delta v_i\, \partial S_1(u_i,v_i)/\partial v, \quad (1)$$

$$v = \delta r_i\, \partial S_2(r_i,s_i)/\partial r + \delta s_i\, \partial s_2(r_i,s_i)/\partial s$$

By using the thus determined $\delta u_i$, $\delta v_i$, $\delta r_i$, and $\delta s_i$, the parameters of the surfaces $S_1$ and $S_2$ at leading points of the tracing vector v are obtained as follows.

$$u'=u_i+\delta u_i,\ v'=v_i+\delta v_i,$$

$$r'=r_i+\delta r_i,\ s'=s_i+\delta s_i$$

In step S13, by means of the known derivative vector generator, the coordinate generator 9 and the normal-vector generator 10, a coordinate $S_1(u', v')$, partial derivatives $\delta S_1(u', v')/\delta u$ and $\delta S_1(u', v')/\delta v$, and a tangent plane $P_1$ of the surface $S_1$ at the new parameters u' and v', and a coordinate $S_2(r', s')$, partial derivatives $\delta S_2(r', s')/\delta r$ and $\delta S_2(r', s')/\delta s$, and a tangent plane $P_2$ of the surface $S_2$ at the new parameters r' and s' are calculated.

In step S14, when the two tangent planes $P_1$ and $P_2$ are parallel to each other, $P'=(S_1(u', v')+S_2(r', s'))/2$. When they are not parallel, an intersection line between the tangent planes is obtained, two projective points on the intersection line by projection from the points $S_1(u', v')$ and $S_2(r', s')$ are obtained, and a middle point between the projective points is determined as being the point P'.

In step S15, $\delta u'$ and $\delta v'$ are determined by solving the following equation (2) which is made when $v_1=P'-S_1(u', v')$ is substituted into the equation (1). Also, $\delta r'$ and $\delta s'$ are determined by solving the following equation (3) which is made when $v_2=P'-S_2(r', s')$ is substituted into the equation (1).

$$v_1=\delta u'\partial S_1(u', v')/\partial u+ \delta v'\partial S_1(u', v')/\partial v \quad (2)$$

$$v_2=\delta r'\partial S_2(r', s')/\partial r+ \delta s'\partial S_2(r', s')/\partial s \quad (3)$$

In step S16, a judgment is made whether or not the values of $\delta u'$, $\delta v'$, $\delta r'$ and $\delta s'$ are small enough. If the values are found small enough, $\delta u'$, $\delta v'$, $\delta r'$ and $\delta s'$ show the parameter values on the intersection curve, and the procedure ends. If they are not small enough, step S17 is performed so that the values of u', v', r' and s' are updated as follows.

$$u'=u'+\delta u',\ v'=v'+\delta v',$$

$$r'=r'+\delta r',\ s'=s'+\delta s',$$

Then, the procedure returns to the step S13.

Figure 4:
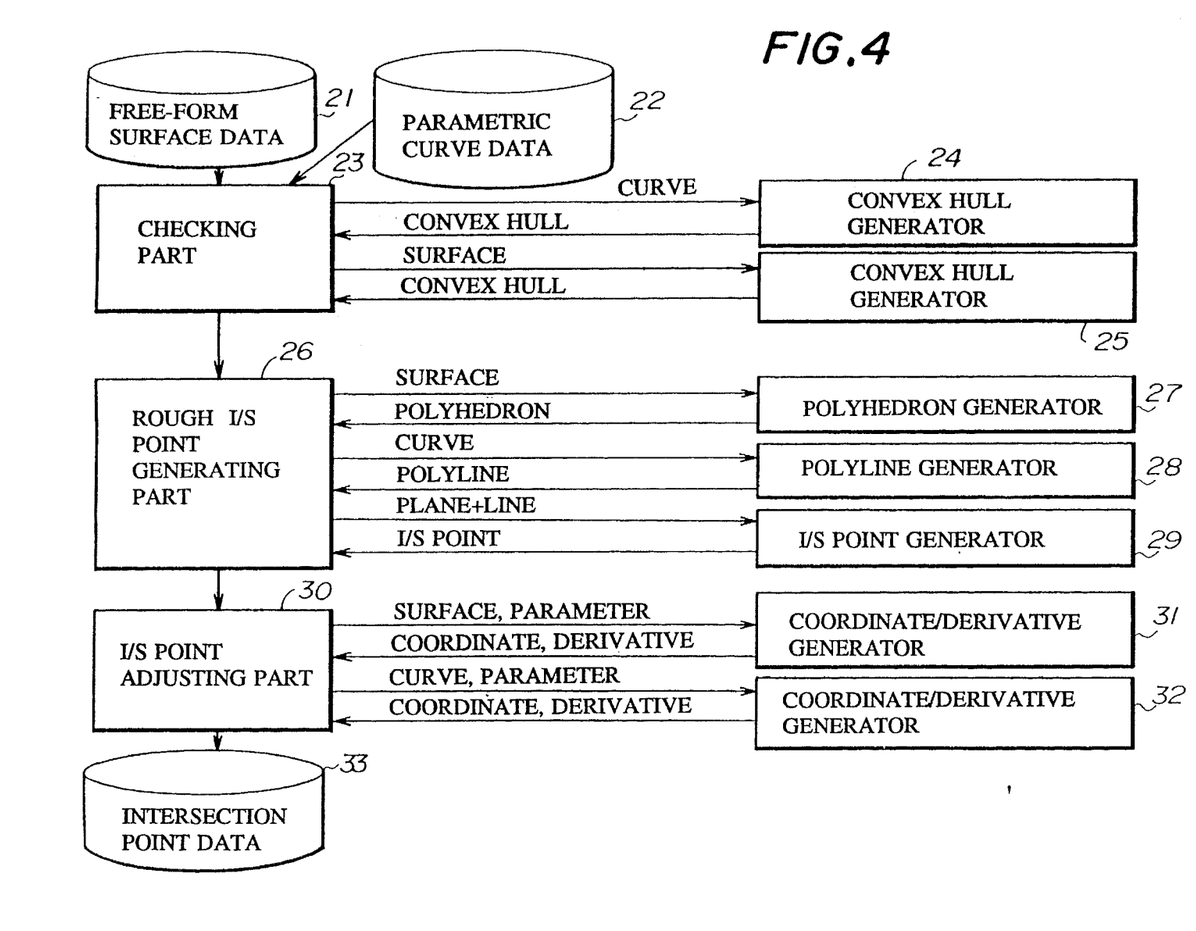
FIG. 4 is a block diagram showing a three-dimensional geometry processing system in a second embodiment of the present invention.

Next, a description will be given of a second embodiment of the present invention, with reference to FIGS. 4 through 7. In FIG. 4, this three-dimensional geometry processing system includes a free-form surface data 21, a parametric curve data 22, a checking part 23 for checking whether or not there is an intersection between convex hulls, a convex-hull generator 24 for generating a convex hull of a control point of a parametric curve, a convex-hull generator 25 for generating a convex hull of a control point of a free-form surface, a rough intersection point generating part 26 for generating a rough intersection point, a polyhedron generator 27 for generating a polyhedron of a free-form surface, a polyline generator 28 for generating a polyline (plural line segments) of a parametric curve, an intersection point generator 29 for generating an intersection point between a plane and a line, an intersection point adjusting part 30 for generating an accurate intersection point by adjusting a rough intersection point, a coordinate/derivative generator 31 for generating a coordinate and a derivative of a free-form surface, a coordinate/derivative generator 32 for generating a coordinate and a derivative of a parametric curve, and an intersection point data 33.

The above mentioned three-dimensional geometry processing apparatus generates a rough intersection point between a free-form surface and a parametric curve, and adjusts the rough intersection point by making use of derivatives of the surface and curve so that an accurate intersection point is generated. The above procedure is repeated by the three-dimensional geometry processing system until it is determined that a difference between the resulting intersection point and the real intersection point falls within a predetermined permissible range, thereby generating an accurate intersection point between the surface and the curve.

Figure 7:
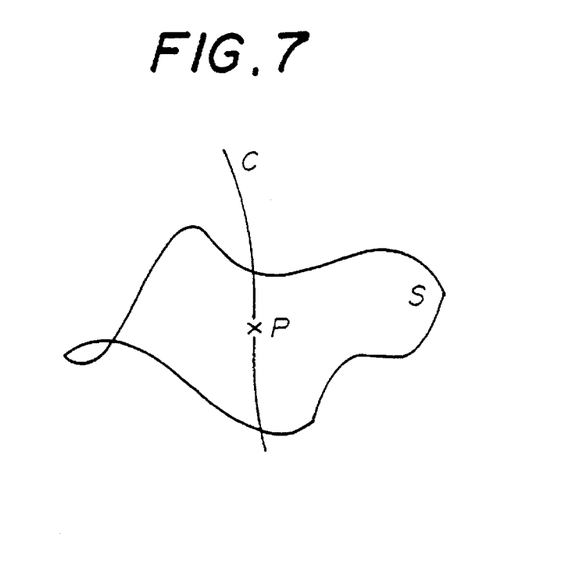
FIG. 7 is a diagram showing an intersection point between a free-form surface and a parametric curve.

The conventional devices used for realizing the construction of the system shown in FIG. 4 are the convex-hull generators 24 and 25, the polyhedron generator 27, the polyline generator 28, the intersection point generator 29, the coordinate/derivative generators 31 and 32. In this second embodiment, the three-dimensional geometry processing system generates an intersection point P between a free-form surface and a parametric curve. The input data, supplied to the system, includes a free-form surface S that is $C^2$ continuous and a parametric curve C that is $C^2$ continuous, and the output data is coordinates of an intersection point P between the surface S and the curve C. FIG. 7 shows this intersection point P between the surface S and the curve C.

The checking part 23 performs rough checking of the presence of intersection between convex hulls, based on data of a convex hull generated by the convex-hull generator 24 from a parametric curve and based on data of a convex hull generated by the convex-hull generator 25 from a free-form surface. The rough intersection point generating part 26 receives data of a polyhedron generated by the polyhedron generator 27 from the surface and data of a polyline generated by the polyline generator 28 from the curve. Based on the data of the polyhedron and the polyline, the intersection point generator 29 receives data of a plane and a straight line based on the polyhedron and polyline and generates a rough intersection point between the plane and the line. The rough intersection point generating part 26 generates the rough intersection point from the generator 29, and generates parameters of the surface and parameters of the curve at the rough intersection point. The intersection point adjusting part 30 generates an accurate intersection point by using the rough intersection point and the parameters of the surface and curve generated by the rough intersection point generating part 26.

Figure 5:
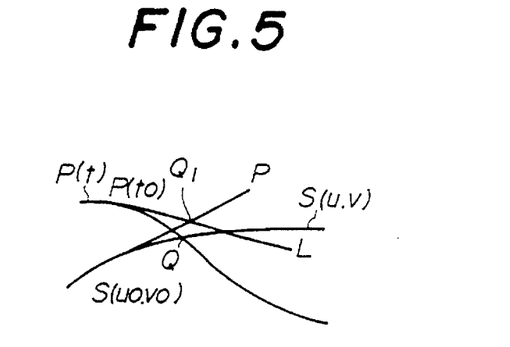
FIG. 5 is a diagram for explaining a procedure of generating an accurate intersection point based on rough intersection points.
Figure 6:
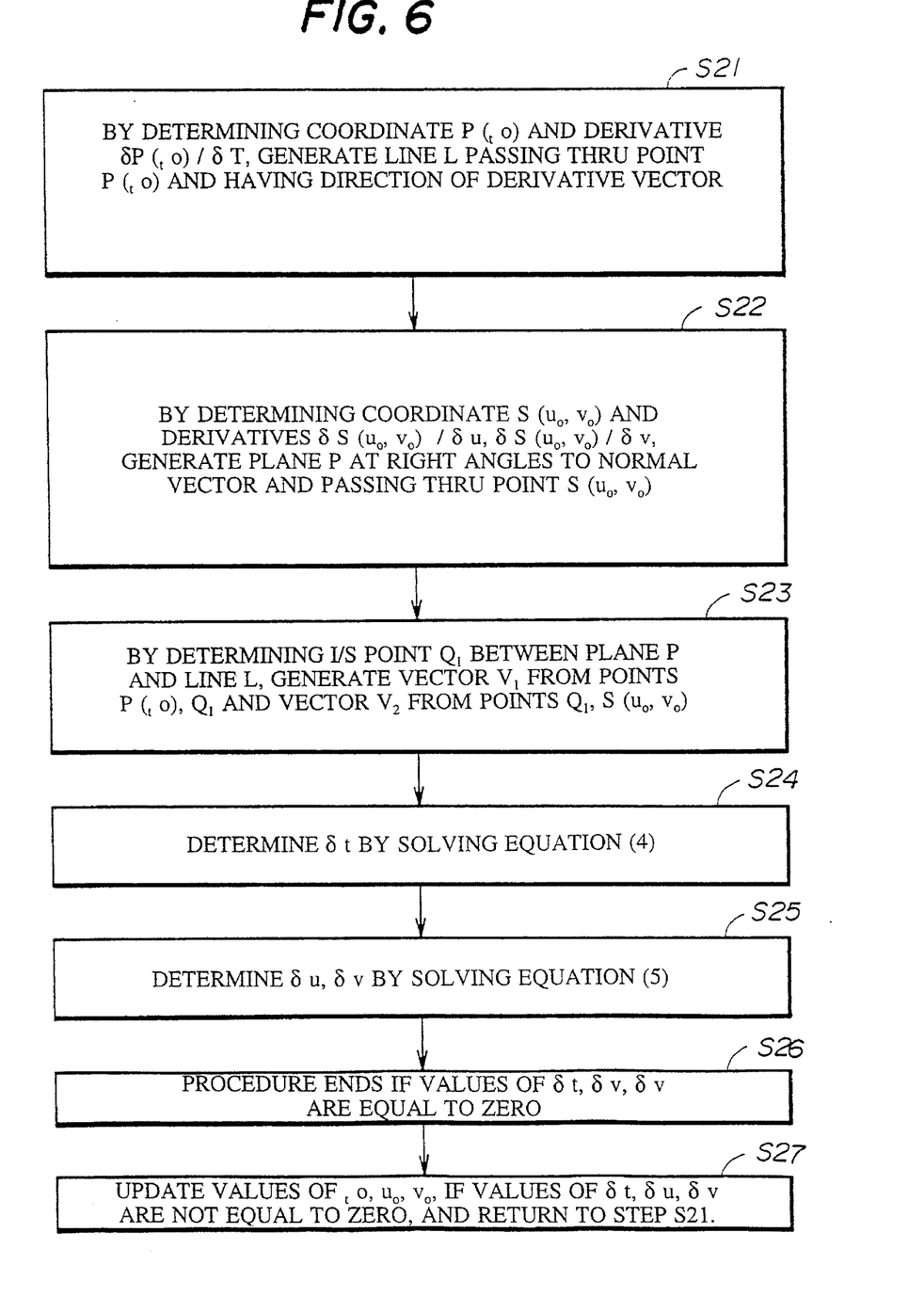
FIG. 6 is a flow chart for explaining a procedure performed by an intersection point adjusting part of the system shown in FIG. 4.

FIG. 6 shows a procedure of generating an accurate intersection point from a rough intersection point, which procedure is performed by the intersection point adjusting part 30. FIG. 5 shows an approximate point $P(t_0)$ on a parametric curve and an approximate point $S(u_0,v_0)$ on a free-form surface, which are located in neighborhood of the accurate intersection point to be determined. It is assumed that $t_0$ is a parameter of the curve $P(t)$ at the rough intersection point, and $u_0$ and $v_0$ are parameters of the surface $S(u,v)$ at the rough intersection point.

In step S21 of the procedure shown in FIG. 6, a coordinate $P(t_0)$ and a derivative $\partial P(t_0)/\partial t$ of the parametric curve are determined by means of the coordinate/derivative generator 31. Based on the coordinate $P(t_0)$ and the derivative $\partial P(t_0)/\partial t$ of the curve, a straight line L is generated which passes through the point $P(t_0)$ and has a direction of the derivative vector $\partial P(t_0)/\partial t$. In step S22, a coordinate $S(u_0, v_0)$ and derivatives $\partial S(u_0, v_0)/\partial u$ and $\partial S(u_0, v_0)/\partial v$ of the free-form surface are generated by means of the coordinate/derivative generator 32. Based on the coordinate $S(u_0, v_0)$ and the derivatives $\partial S(u_0, v_0)/\partial u$ and $\partial S(u_0, v_0)/\partial v$ of the surface, a plane P is generated which passes through the point $S(u_0, v_0)$ and is perpendicular to the direction of the normal vector $\partial S(u_0, v_0)/\partial u \times \partial S(u_0, v_0)/\partial v$.

In step S23, an intersection point $Q_1$ between the plane P and the line L is determined, and a vector $v_1$ between the point $P(t_0)$ and the point $Q_1$ and a vector $v_2$ between the point $S(u_0, v_0)$ and the point $Q_1$ are generated. In step S24, the value of $\delta t$ is determined by solving the following equation (4).

$$v_1 = \delta t \partial P(t_0)/\partial t \qquad (4)$$

In step S25, the values of $\delta u$ and $\delta v$ are determined by solving the following equation.

$$v_2 = \delta u \partial s(u_0,v_0)/\partial u + \delta v \partial s(u_0,v_0)/\partial v \qquad (5)$$

In step S26, if the values of $\delta t$, $\delta u$ and $\delta v$ thus determined are equal to zero, the intersection point $Q_1$ at such a time is an accurate intersection point to be determined and the above procedure ends. If the values of $\delta t$, $\delta u$ and $\delta v$ are not equal to zero, step S27 is performed so that the values of $t_0$, $u_0$ and $v_0$ are renewed based on the following formulas.

$$t_0 = t_0 + \delta t, u_0 = u_0 + \delta u,$$

$$v_0 = v_0 + \delta v$$

Then, the procedure returns to step S23.

In this manner, the intersection point adjusting part 30 generates an accurate intersection point from the approximate values of the coordinates $t_0$, $u_0$ and $v_0$ of the rough intersection points. The above described method does not greatly depend on the types of a parametric curve and a free-form surface. The accurate intersection point can be generated if the coordinate and derivatives are determined when parameters of the curve and surface at neighborhood points are given. It is to be noted that the above described method (FIG. 4) is one of methods for selecting a start point from which the tracing of intersection is started.

Next, a description will be given of a third embodiment of the present invention, with reference to FIG. 7. A three-dimensional geometry processing system in this embodiment generates an intersection point between three free-form surfaces, and this intersection point has accurate coordinates, regardless of what type of the surfaces is processed. It is to be noted that this system serves as part of the three-dimensional geometry processing system shown in FIG. 1 when an intersection curve between the surfaces is generated. The conventional devices used for realizing this embodiment of the present invention are: the above mentioned coordinate generator for generating coordinates of points on a free-form surface, the above normal-vector generator for generating a normal vector of a free-form surface, the above derivative-vector generator for generating a derivative vector of a free-form surface, the above projective-point generator for generating a projective point by projection from a point onto an algebraic surface, the above intersection-point generator for generating an intersection point between three planes, and the above parameter generator for generating a parameter of a free-form surface at a point which is located on the surface at the least distance from a specified point.

Figure 8:
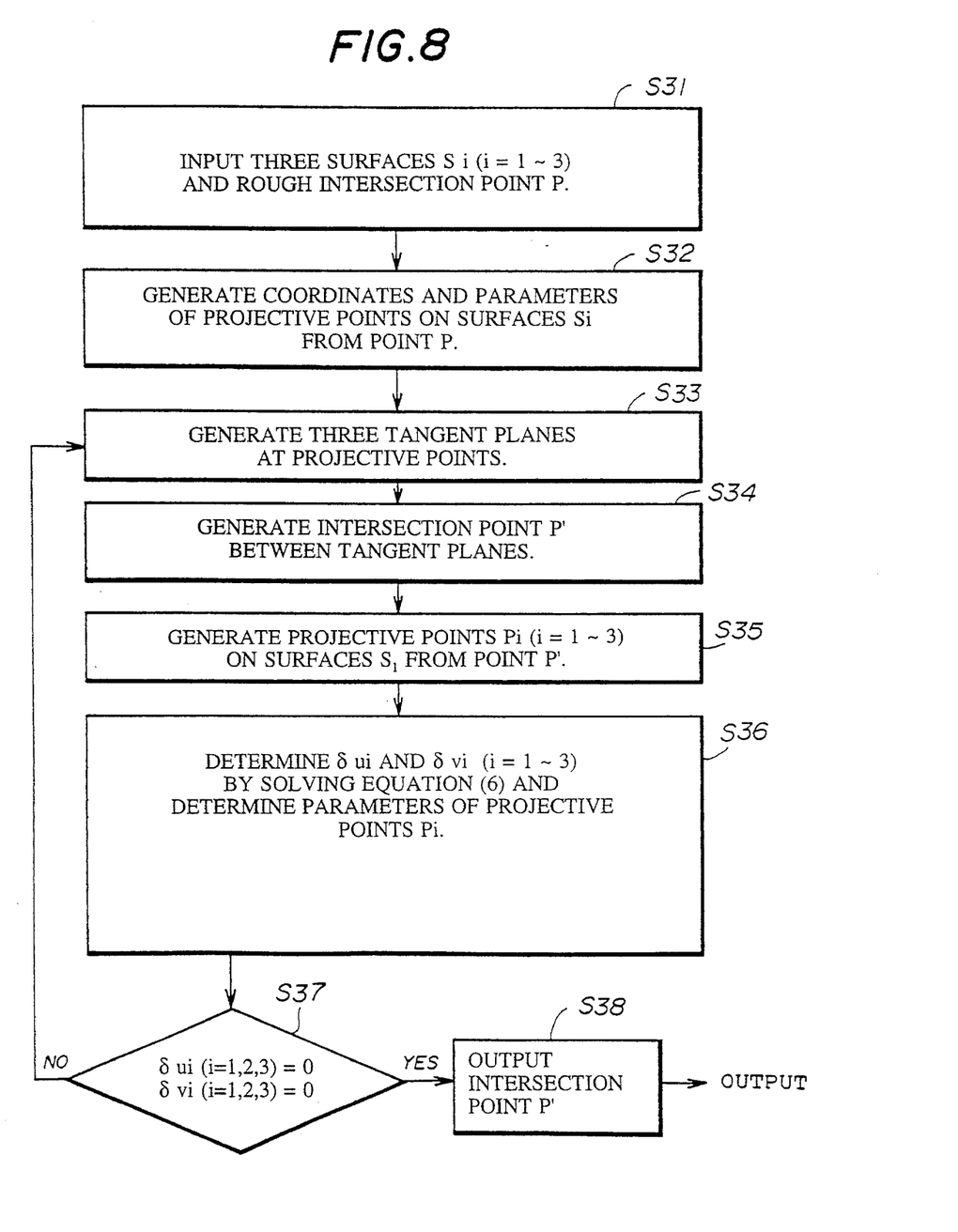
FIG. 8 is a flow chart for explaining a procedure performed by a three-dimensional geometry processing system in a third embodiment of the invention.

FIG. 8 shows a procedure of generating an intersection point between three surfaces. Data of three surfaces $S_1$, $S_2$ and $S_3$ as well as a rough intersection point P between the three surfaces, generated by a known generator separate from this system, is the input to this three-dimensional geometry processing system.

In steps 31, the data of three surfaces $S_1$, $S_2$ and $S_3$ and a rough intersection point P between the three surfaces is input to the system. In step S32, coordinates and parameters of projective points obtained by projection from the point P onto the surfaces $S_1$, $S_2$ and $S_3$ are generated. When the surfaces Si (i=1,2,3) are algebraic surfaces, coordinates of the projective points are generated by means of the above coordinate generator. When the surfaces Si are free-form surfaces, parameters of the projective points are generated by means of the above parameter generator.

In step S33, three tangent planes at the projective points, obtained in the step S32 on the surfaces Si are generated by using a normal vector, perpendicular to each of the surfaces, generated by means of the above normal-vector generator. In step S34, an intersection point P' between the three tangent planes, obtained in the step S33, is generated by means of the above intersection-point generator. In step S35, three projective points Pi (i=1,2,3) are generated by projection from the point P' onto the surfaces Si. In this case, when the surfaces Si are algebraic surfaces, the projective points Pi are generated by projection from the point P' onto the surfaces Si, by using the above projective-point generator. When the surfaces Si are free-form surfaces, the projective points Pi are generated by using a vector P'-Pi and derivative vectors of the surfaces generated by means of the above derivative generator.

In step S36, $\delta u_i$ and $\delta v_i$ (i=1,2,3) are determined by solving the following equations.

$$P' - P_i = \delta u_i\, \partial S_i(u_i,v_i)/\partial u + \delta v_i\, \partial S_i(u_i,v_i)/\partial v \qquad (6)$$

$(i = 1 \text{ to } 3)$

This allows the parameters of the projective points Pi obtained by projection from the point P' onto the free-form surfaces Si to be determined as being $u_i+\delta u_i$ and $v_i+\delta v_i$.

In step S37, a judgment is made whether or not the values of $\delta u_i$ and $\delta v_i$ ($i=1,2,3$) are approximately equal to zero. If the values of $\delta u_i$ and $\delta v_i$ are approximately equal to zero, the new projective points Pi are located very close to the previous projective points. In step S38, the intersection point P' at this time is output and the procedure ends. If the values of $\delta u_i$ and $\delta v_i$ are not equal to zero, the procedure returns to the step S33 so that new tangent planes at the projective points Pi are generated for the subsequent steps.

Figure 9:
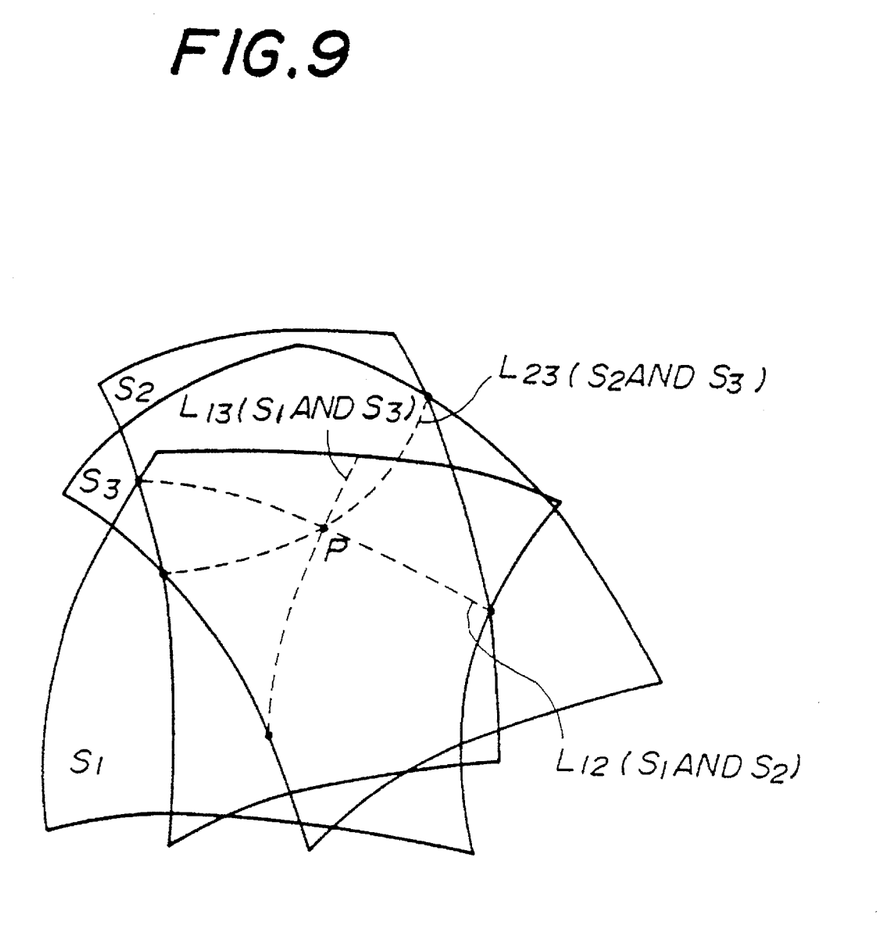
FIG. 9 is a diagram showing an intersection point between three surfaces which is generated by the system in the third embodiment of the invention.

FIG. 9 shows an accurate intersection point between three surfaces. In FIG. 9, $L_{12}$ is an intersection curve between the surfaces $S_1$ and $S_2$, $L_{13}$ is an intersection curve between the surfaces $S_1$ and $S_3$, and $L_{23}$ is an intersection curve between the surfaces $S_2$ and $S_3$. The intersection point P is also an intersection point between these intersection curves.

Figure 10:
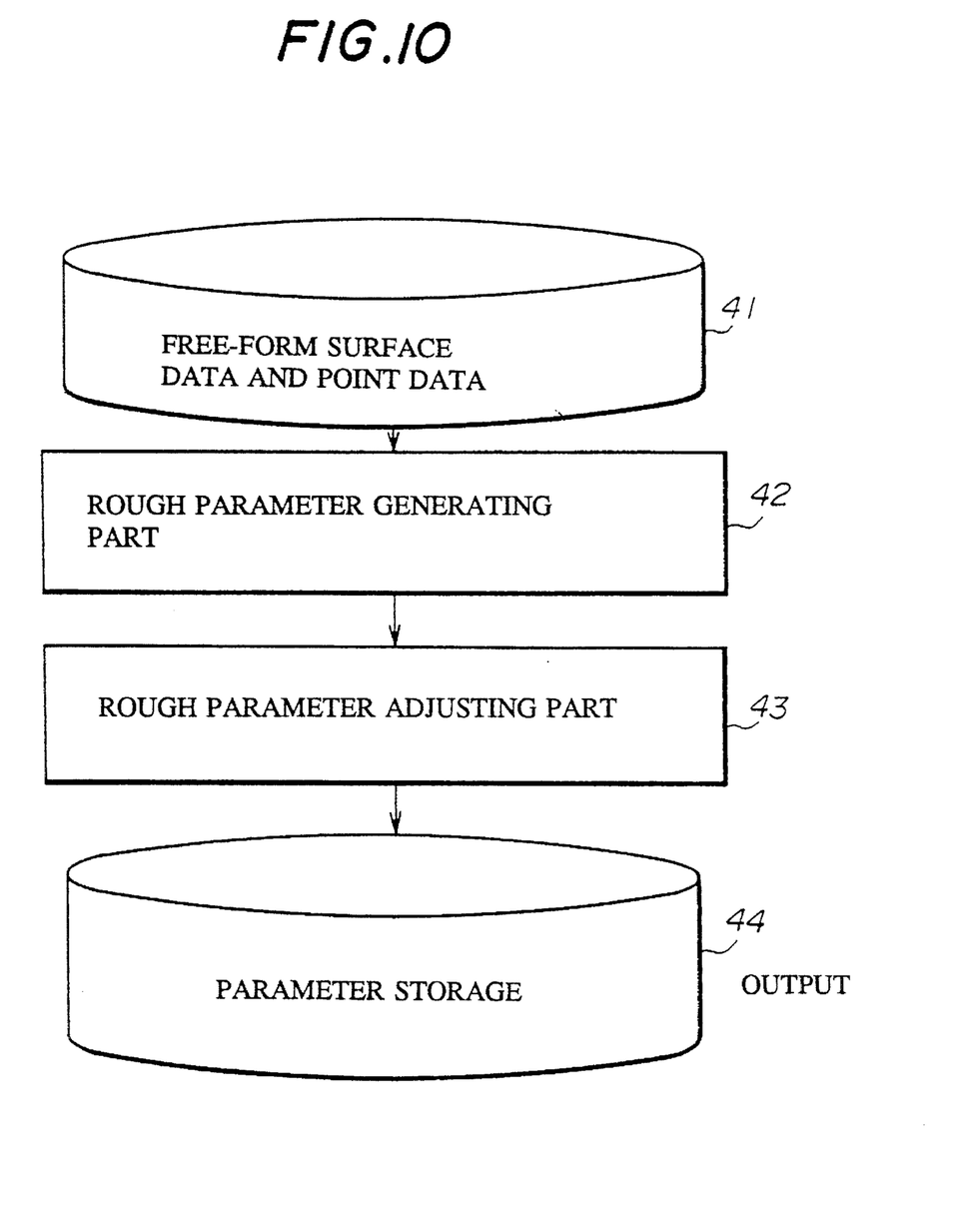
FIG. 10 is a diagram showing a three-dimensional geometry processing system in a fourth embodiment of the invention.

Next, a description will be given of a fourth embodiment of the invention, with reference to FIGS. 10 through 14. In this embodiment, a latter half of the procedure of generating an internal intersection point between the two surfaces when the candidate points are stored in the endpoint table is performed, which procedure is performed by the start-point generating part 5 of the system shown in FIG. 1. In FIG. 10, this three-dimensional geometry processing system includes a surface/point data 41 containing a free-form surface (S) and a point (P), a rough parameter generating part 42 for generating rough parameters based on the surface (S) and the point (P), a rough parameter adjusting part 43 for generating accurate parameters of the surface (S) at the point (P) based on the rough parameters generated by the part 42, and a parameter storage part 44 in which the accurate parameters from the part 43 are stored. When this three-dimensional geometry processing system is used, accurate parameters of a given surface at a given point can be generated even when the point does not lie precisely on the surface.

The conventional devices used for realizing this embodiment of the invention are: the above mentioned polyhedron generator for generating a polyhedron based on a surface data, the above projective-point generator for generating a projective point by projection from a point onto a plane, the above derivative generator for generating a derivative of a free-form surface, and the above normal-vector generator for generating a normal vector of a free-form surface.

Figure 13A:
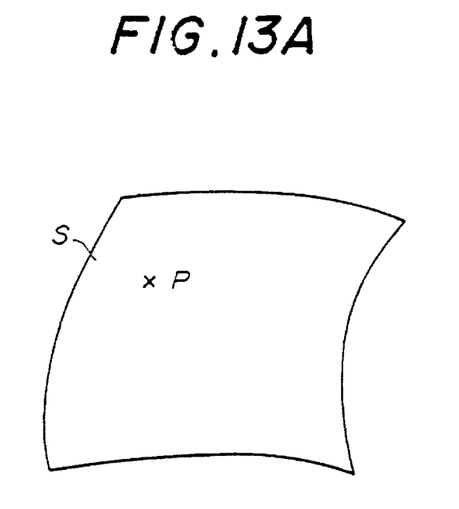
FIGS. 13A and 13B are diagrams for explaining a procedure of generating a parameter of a free-form surface when a point does not lie on the surface precisely.
Figure 13B:
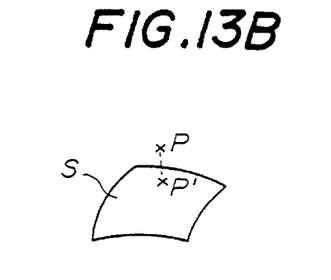

In this embodiment, a free-form surface data (S) and a point data (P) are input to the three-dimensional geometry processing system shown in FIG. 10, and parameters of the surface S at the point P are output by the system shown in FIG. 10. FIG. 13A shows the point P lying on the surface S, and, in this case, the parameters of the surface S at the point P are generated. When the point P does not lie on the surface S precisely, parameters of the surface S at a projective point from the point P are the output, and this projective point is generated by projection from the point P onto the surface S. FIG. 13B shows the projective point P' on the surface S from the point P.

Figure 11:
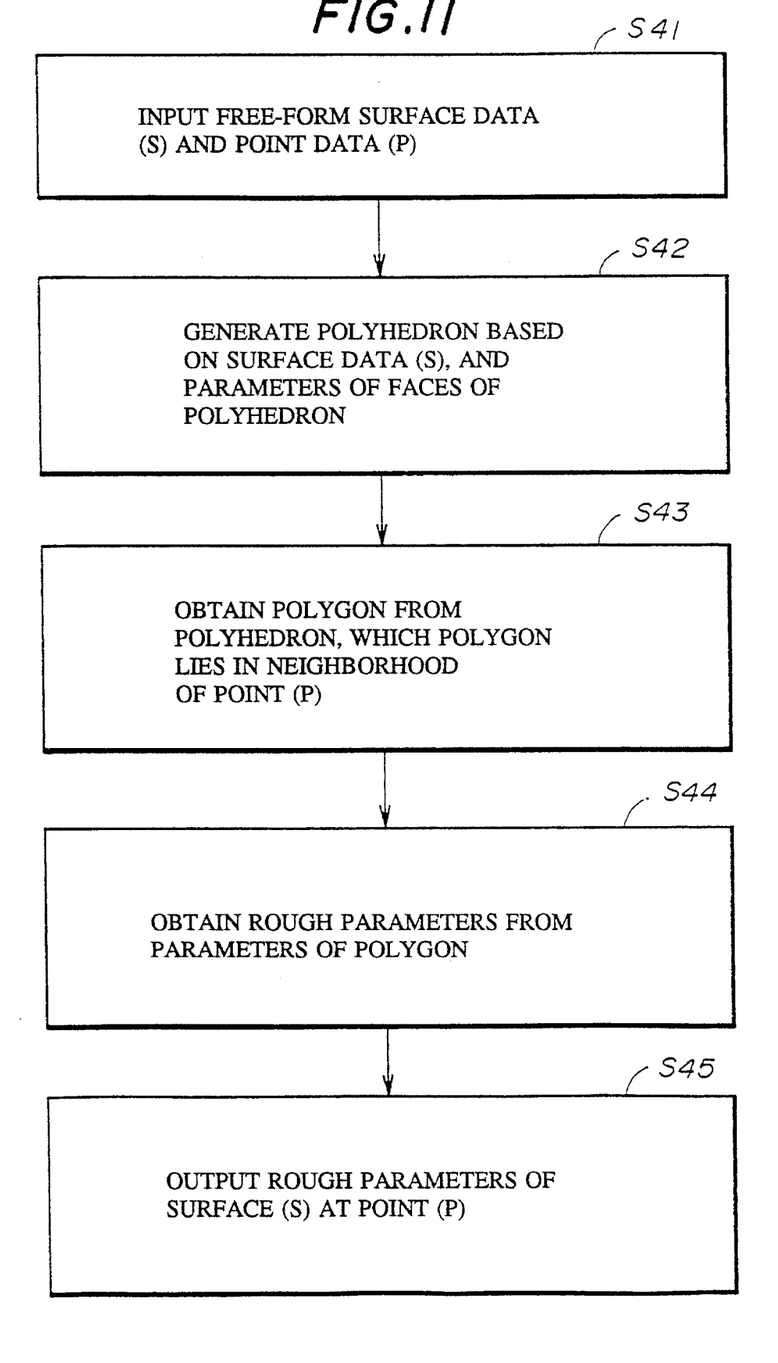
FIG. 11 is a flow chart for explaining a procedure performed by a rough parameter generating part of the system shown in FIG. 10.

FIG. 11 shows a procedure of generating rough parameters of a surface at a point P which procedure is performed by the rough parameter generating part 42 of the system shown in FIG. 10. In step S41, a free-form surface data (S) and a point data (P) are input to the system. In step S42, a polyhedron is generated based on the surfaces data (S) by means of the known polyhedron generator, and, together with the polyhedron, parameters of each of the polyhedron faces at endpoints of each of the polyhedron faces are generated. In step S43, a polygon lying in neighborhood of the point P is selected from among the polyhedron faces. In step S44, rough parameters are determined by using the parameters of the polygon included in the generated parameters of the polyhedron. When the point P does not lie on the surface S precisely, a projective point P' is generated by means of the known projective-point generator by projection from the point P on the polygon, and rough parameters of the polygon at the point P' are determined. In step S45, the rough parameters of the surface S at the point P are output by the rough parameter generating part 43.

Figure 12:
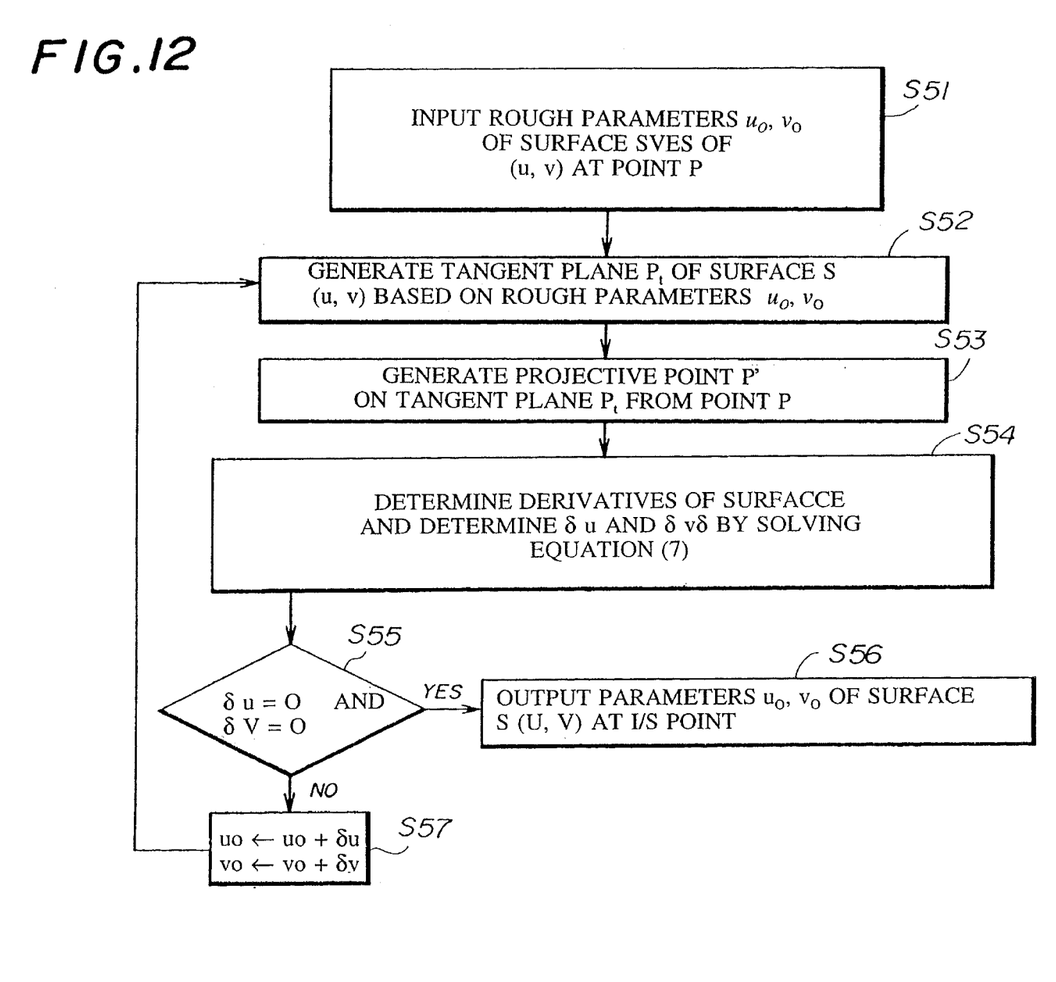
FIG. 12 is a flow chart for explaining a procedure performed by a rough parameter adjusting part of the system shown in FIG. 10.

FIG. 12 shows a procedure performed by the rough parameter adjusting part 43 of the system shown in FIG. 10. In step S51, rough parameters $u_0$ and $v_0$ of the surface $S(u,v)$ at the point P are received from the rough parameter generating part 42. In step S52, a tangent plane Pt of the surface $S(u,v)$ is generated based on the rough parameters $u_0$ and $v_0$, by using a normal vector of the surface $S(u,v)$ obtained by means of the known normal-vector generator. In step S53, a projective point P' from the point P on the tangent plane Pt is generated by means of the known projective-point generator. In step S54, derivatives $\partial S(u_0,v_0)/\partial u$ and $\partial S(u_0,v_0)/\partial v$ of the surface $S(u,v)$ at the rough parameters $u_0$ and $v_0$ are determined by means of the known normal-vector generator, and $\delta u$ and $\delta v$ are determined by solving the following equation using the determined derivatives.

$$p'-S(u_0,v_0)=\delta u\, \partial S(u_0,v_0)/\partial u + \delta v\, \partial S(u_0,v_0)/\partial v \qquad (7)$$

In step S55, a judgment is made whether or not the values of $\delta u$ and $\delta v$ are small enough, or approximately equal to zero. When the values of $\delta u$ and $\delta v$ are small enough, the parameters $u_0$ and $v_0$ of the surface S at that time are output by the rough parameter adjusting part 43 as accurate parameters, and the procedure ends in step S56. When the values of $\delta u$ and $\delta v$ are not small enough, the parameters $u_0$ and $v_0$ are renewed in step S57 as follows, and the procedure returns to the step S52.

$$u_0=u_0+\delta u, v_0=v_0\delta v$$

Figure 14:
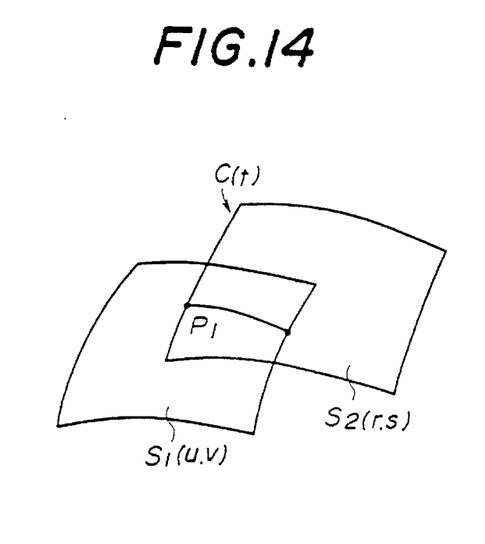
FIG. 14 is a diagram for explaining a procedure of generating an intersection point between two surfaces.

FIG. 14 shows an intersection point between two surfaces. A procedure of generating an intersection point $P_1$ between a surface $S_1(u,v)$ and a surface $S_2(r,s)$ based on parameters of the surfaces $S_1$ and $S_2$ at the point $P_1$ will now be described. The intersection point $P_1$ is determined based on a parameter $t_0$ of an intersection curve $C(t)$ and based on parameters $u_0$ and $v_0$ of the surface $S_1(u,v)$. By determining the intersection point $P_1$ in this manner, parameters $r_0$ and $s_0$ of the surface $S_2(r,s)$ are generated. This means that the thus determined intersection point $P_1$ includes the data of the parameters $u_0$ and $v_0$ of the surface $S_1(u,v)$ and includes the data of the parameters $r_0$ and $s_0$ of the surface $S_2(r,s)$. Therefore, according to the present invention, it is possible to generate accurate parameters of the surfaces based on the intersection point $P_1$.

Further, the present invention is not limited to the above described embodiments, and variations and modifications may be made without departing from the scope of the present invention.

What is claimed is:

1. An apparatus for generating, from surface data and curve data, an intersection point between a surface and a curve, for use in a three-dimensional geometry processing system, the apparatus comprising:
- a) checking means for checking whether or not there is an intersection between convex hulls by obtaining:
  1) a convex hull of the surface at a given control point, and
  2) a convex hull of the curve at a given control point;
- b) generating means including:
  1) means for generating a rough intersection point which is an intersection point between:
     i) a polygonal face of a polyhedron obtained from the surface data, and
     ii) a segment of a polyline obtained from the curve data; and
  2) means for generating an initial parameter with respect to an initial point on the surface located at the rough intersection point and an initial parameter with respect to an initial point on the curve located at the rough intersection point; and
- c) adjusting means for generating an intersection point between the surface and the curve, by updating respective parameters of the surface and the curve, starting from the initial parameters with respect to the initial points, and ending at secondary parameters with respect to secondary points on the surface and the curve, wherein:
  1) the secondary points are nearer to the intersection point between the surface and the curve than the initial points; and
  2) the adjusting means includes means for performing steps A), B), C) and D), in order to update the respective parameters of the surface and the curve:
- A) generating a tangent plane of the surface at the initial point on the surface and a tangent line of the curve at the initial point on the curve, based on the initial parameters;
- B) generating a secondary rough intersection point which is an intersection point between the tangent plane and the tangent line;
- C) generating the secondary parameters with respect to the secondary point on the surface nearest the secondary rough intersection point and with respect to the secondary point on the curve nearest the secondary rough intersection point; and
- D) repeating the steps A), B) and C) until respective changes from the initial parameters to the secondary parameters are detected to meet a convergence criterion.

2. An apparatus for generating, from surface data and point data, parameters of a surface at a point, for use in a three-dimensional geometry processing system, the apparatus comprising:
- a) input means for inputting the surface data and the point data;
- b) rough parameter generating means including:
  1) means for generating a polygonal face of a polyhedron on the surface near the point, based on the surface data and the point data; and
  2) means for generating rough parameters with respect to an endpoint of the polygonal face, and rough parameters with respect to a first projective point based on the rough parameters of the endpoint, by obtaining the first projective point by projecting the point onto the polygonal face; and
- c) parameter adjusting means including:
  1) means for generating a tangent plane of the surface at the first projective point, based on the rough parameters generated by the rough parameter generating means; and
  2) means for generating parameters of the surface at the point by repeatedly updating the rough parameters of the surface, starting from the rough parameters with respect to the first projective point, and continuing to rough parameters with respect to a second projective point which is obtained by projecting the point onto a subsequently generated polygonal face, until respective changes in the rough parameters of the surface from the first projective point to the second projective point meet a convergence criterion.

* * * * *